United States Patent [19]
Murai

[11] Patent Number: 5,986,726
[45] Date of Patent: Nov. 16, 1999

[54] FLAT PANEL DISPLAY DEVICE

[75] Inventor: Tetsuya Murai, Saitama-ken, Japan

[73] Assignee: Kabushiki Kaisha Toshiba, Kawasaki, Japan

[21] Appl. No.: 09/192,571

[22] Filed: Nov. 17, 1998

[30] Foreign Application Priority Data

Nov. 17, 1997 [JP] Japan ................................ P09-314929

[51] Int. Cl.⁶ ............................ G02F 1/1333; H05K 5/00
[52] U.S. Cl. ................................ 349/59; 349/58; 361/681
[58] Field of Search ............................ 349/58, 59, 60; 361/681; 364/708.1

[56] References Cited

U.S. PATENT DOCUMENTS

| | | | |
|---|---|---|---|
| 5,442,470 | 8/1995 | Hashimoto | 349/58 |
| 5,477,423 | 12/1995 | Fredriksz et al. | 349/58 |
| 5,489,999 | 2/1996 | Matsumoto | 349/58 |
| 5,659,376 | 8/1997 | Uehara et al. | 349/60 |
| 5,666,172 | 9/1997 | Ida et al. | 349/58 |
| 5,703,665 | 12/1997 | Muramatsu et al. | 349/58 |
| 5,719,752 | 2/1998 | Mori et al. | 349/58 |
| 5,831,813 | 11/1998 | Johns et al. | 349/60 |
| 5,870,160 | 2/1999 | Yanagawa et al. | 349/59 |

FOREIGN PATENT DOCUMENTS 9-120057  5/1997  Japan .

*Primary Examiner*—William L. Sikes
*Assistant Examiner*—Tavifur R. Chowdhury
*Attorney, Agent, or Firm*—Pillsbury Madison & Sutro LLP

[57] ABSTRACT

A flat panel display device includes a driver circuit board, a resin frame, and a metal sheet, the edge portion of which is provided with a U-shaped engagement portion to receive the resin frame. The metal sheet reinforces the resin frame and also shields electromagnetic wave noises from the driver circuit board.

9 Claims, 6 Drawing Sheets

FLAT PANEL DISPLAY DEVICE

BACKGROUND OF THE INVENTION

Field of the Invention

This invention relates to a flat panel display device used for note type personal computers, car navigation systems, portable television receiver sets and the like and, more particularly, to an improvement to a mechanical structure of a flat panel display device.

The structure of a conventional flat panel display device will be explained hereinafter with reference to FIG. 9. The flat panel display device 100 includes a passive display element, such as a liquid crystal display panel 105, and a back lighting system to illuminate the display panel 105.

The back lighting system is provided with a light guiding plate 107, and a lamp and its cover (not shown). The light guiding plate 107 is held in a resin frame 102. The display panel 105 is disposed on the light guiding plate 107 and the resin frame 102. The light guiding plate 107 conducts light beams from the lamp and irradiate them toward the panel 105. A driver circuit board 104 to generate driving signals for the display panel 105 is provided underneath the resin frame 102 and is connected to the panel 105 through a tape carrier package (TCP) 106. The TCP 106 comprises a flexible printed circuit film and a driver integrated circuit (IC) 161 mounted on the film. An upper surface peripheral and a surrounding edge wall of the flat panel display device 100 are covered with a metal bezel 108 assembled in a picture-frame form by L-shaped cross-section metal girders.

The light guiding plate 107, a receiving portion 121 of the resin frame 102 and the driver circuit board 104 are piled in thickness-direction structure in the conventional flat panel display device 100. A portable-type flat panel display device, however, is required to be smaller in size, thinner in thickness and lighter in weight than the conventional flat panel display device. In order to comply with those requirements, it is necessary to reduce the thickness of the receiving portion 121. Since an enclosing frame portion 122 of the resin frame 102 encloses the outer edge of the light guiding plate 107, it is also desirable that the width of the enclosing frame portion 122 (the distance between the outer edge surface of the light guiding plate 107 and that of the resin frame 102) is made as narrow as possible. Such structural changes may result in reduction of the mechanical strength of a flat panel display. Thus, it is difficult to secure sufficient reliability therefor against mechanical shocks or vibrations occurred in ordinary use or in use on a vehicle.

Further, the driver circuit board 104 is not prevented from electromagnetic interference with electronic components on the side of the display panel 100. Electromagnetic wave noises are not well suppressed in such a conventional flat panel display device. Particularly, electromagnetic wave noises increase as the mainstream of a flat panel display device is changed from the video graphic application (VGA; 480×640 pixels) to the super video graphic application (SVGA; 600×800 pixels). It is to be still changed from the excellent graphic application (XGA; 768×1024) to the super excellent graphic application (SXGA; 1024×1280). It is, therefore, indispensable to prevent the driver circuit board 104 from such electro-magnatic wave interference with other electronic components. Although the driver circuit board 104 may be contained in a metal case to avoid the interference, it does not always meet the requirements for flat panel display devices, such as small sizes and light weight.

An object of the present invention is to provide a flat panel display device with features of small size, thin thickness and light weight.

An object of the invention is to provide a flat panel display device with sufficient mechanical strength and high reliability. A frame of the flat panel display device is particularly strengthened to protect a display panel.

An object of the invention is to provide a flat panel display device which substantially prevents electromagnetic wave noises generated by a driver circuit board from interfering with other electronic components.

A first aspect of a flat panel display device in accordance with the present invention includes a substantially rectangle-shaped resin frame defined by four girders, a picture-frame like bezel, a display panel and a driver circuit board to drive the display panel. The front of the display panel is supported by the resin frame and the bezel while the driver circuit board is disposed under the back surface of the display panel. A metal sheet is provided between the driver circuit board and the display panel to shield electromagnetic wave noises generated from the driver circuit board. The metal sheet is engaged with or jointed to the resin frame to increase the strength of the resin frame as a reinforcement plate.

With the above-described structure, a portable-type flat panel display device is provided with features of a small size and lightweight and, at the same time, the metal sheet functions as a reinforcement plate so that the strength of the frame to protect the display panel can be increased and the reliability thereof can be also enhanced. Further, the metal sheet can effectively avoid leaking electromagnetic wave noises generated from the driver circuit board.

A second aspect of a flat panel display device in accordance with the invention is characterized in folded portions which is U-shaped in cross-section and is provided at the edges of the metal sheet to engage or joint the resin frame.

With this structure, even though the metal sheet is thin in thickness, a flat panel display device is provided with sufficient strength.

A third aspect of a flat panel display device in accordance with the invention is characterized in the metal sheet with a substantially right triangle shape, the slop of which is substantially consistent with a diagonal line of the display panel.

This particular structure materializes the flat panel display device with features of light weight and sufficient strength.

A fourth aspect of a flat panel display device in accordance with the invention is characterized in the metal sheet or a light guiding plate together therewith only disposed between the display panel and the driver circuit board.

This structure materializes the flat panel display device with a thin thickness.

A fifth aspect of a flat panel display device in accordance with this invention includes a resin frame defined by a substantial rectangle of four girders, a picture-frame like bezel and a display panel. The front of the display panel is supported by the resin frame and the bezel while the driver circuit board is disposed under the back surface of the display panel. A supporting member or a reinforcement plate made of a metal sheet is provided at a place corresponding to a diagonal line of the rectangle or at places corresponding to the corners thereof.

This structure materializes a flat panel display device with features of a small size and light weight. At the same time, the strength of the frame structure and the reliability thereof are maintained or increased to protect the display panel.

The above-stated and other objects and advantages of the invention will become apparent from the following description when taken with the accompanying drawings. It will be understood, however, that the drawings are for purposes of illustration and are not to be construed as defining the scope or limit of the invention, reference being had for the latter purpose to the claims appended hereto.

DETAILED DESCRIPTION OF THE INVENTION

Figure 1:
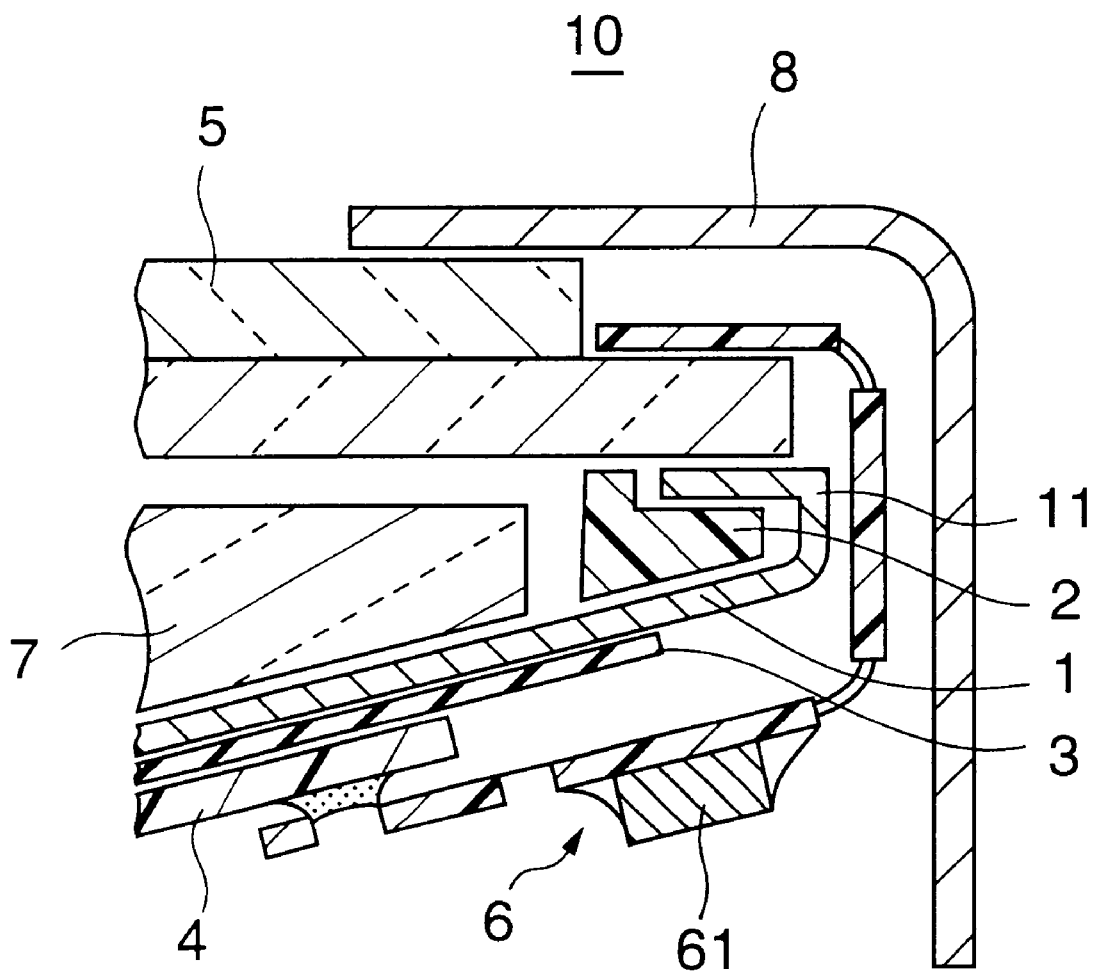
FIG. 1 is a longitudinal cross section of a surrounding portion of a first embodiment of a flat panel display device in accordance with the present invention.

Referring now to the drawings, wherein like reference characters designate like or corresponding parts throughout the several views, FIGS. 1 through 4 illustrate a first embodiment of a back lighting-type flat panel display device in accordance with the present invention.

Figure 2:
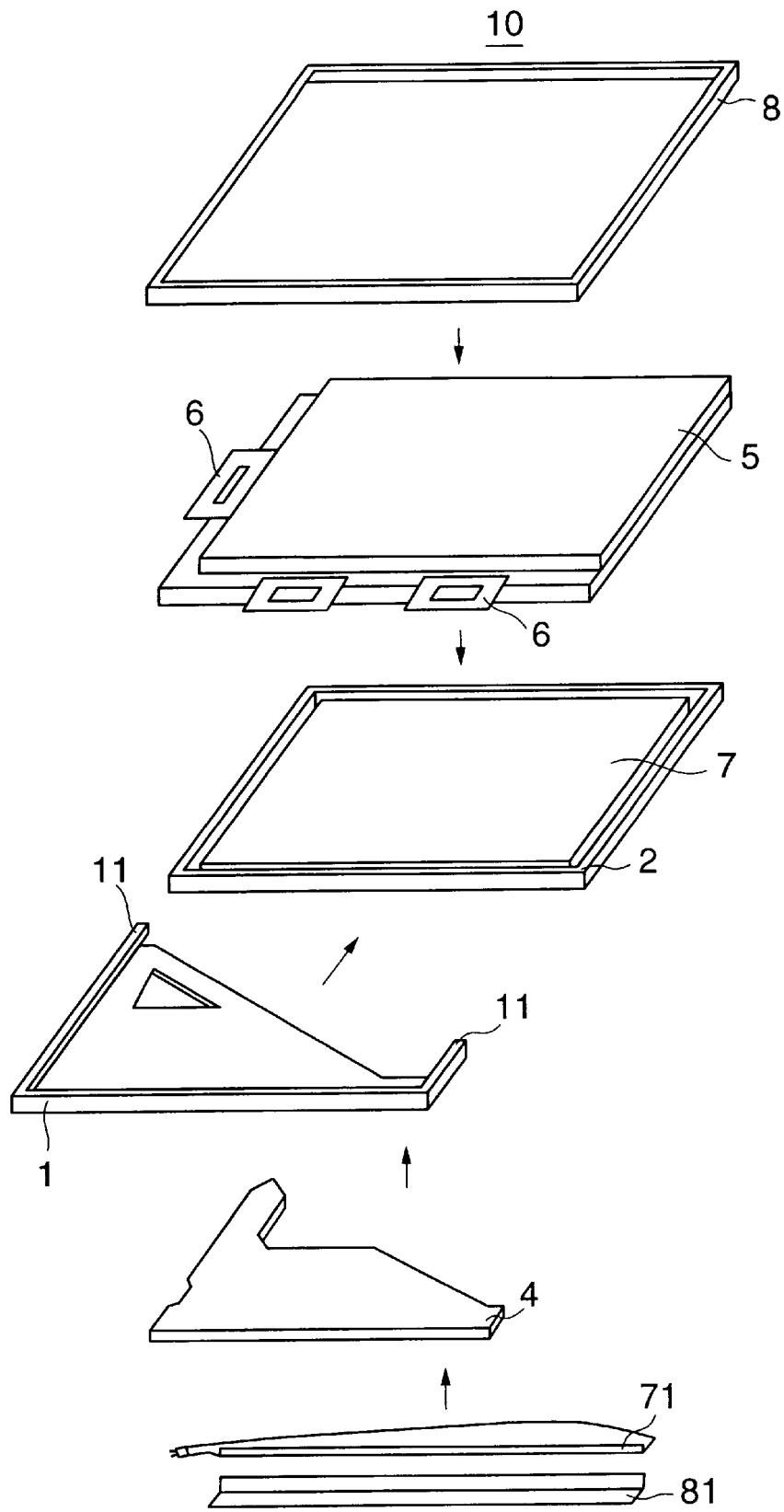
FIG. 2 is a perspective view of components to be assembled into the flat panel display device shown in FIG. 1.

FIG. 1 shows a longitudinal cross section of a surrounding portion in the flat panel display device 10. FIG. 2 shows a perspective view of components to be assembled into the flat panel display device 10.

A resin frame 2 is disposed to enclose peripheral edges of a light guiding plate 7 as shown in FIG. 2. A metal sheet 1 is provided on the back surfaces of the resin frame 2 and the light guiding plate 7. The metal sheet 1 is substantially a rectangle in shape whose sides correspond to the longer and shorter sides and the diagonal line of the resin frame 2. Engagement portions 11 are folded upward and inward at the edges on the longitudinal and lateral sides of the resin frame 2 to define U-shape in cross section. The oblique side of the metal sheet 1 and then longitudinal and lateral sides are slidable and movable toward the resin frame 2 and are eventually engaged therewith. The engagement portions 11 enclose and hold the resin frame 2. Thus, the metal sheet 1 is assembled into a frame structure.

A driver circuit board 4 is disposed on the bottom surface of the metal sheet 1 through an isolation sheet 3 (not shown in FIG. 2). The driver circuit 4 is screwed up to the metal sheet 1 and the resin frame 2.

A display panel 5, such as a liquid crystal display panel, is mounted on the front surfaces of the resin frame 2 and the light guiding plate 7. A tape carrier packages (TCP) 6 (its upper strips are shown in FIG. 2) with a driver IC 61 (see FIG. 1) is connected to terminals of the display panel 5 and supplies driving signals thereto from the driver circuit board 4. The TCP 6 is folded inward to connect the driver circuit board 4. A metal bezel 8 is attached to cover front surfaces of four corners of the display panel 5, surrounding portions thereof, and outer surfaces of the TCP 6. An assembly of a lamp 71 is installed between a longer side of the resin frame 2 and the light guiding plate 7 and a lamp cover 81 is attached to the lamp 71.

As shown in FIG. 1, the light guiding plate 7 is held in a frame structure defined by the metal sheet 1 and the resin frame 2. The metal sheet 1 and the isolation sheet 3 are only disposed between the light guiding plate 7 and the driver circuit board 4 so that a shelf-like extending portion (the light guiding plate receiving portion 121 of the conventional resin frame 102) is not provided. Thus, the flat panel display device become thin in thickness at the portions to receive the driver circuit board 4. For example, the metal sheet 1 is made of a 0.2 mm thick stainless steel sheet and the isolation film 3 made of a 50 $\mu$m (0.05 mm) thick PET film. The extending portion (light guiding receiving portion 121) of the conventional flat panel display is at the minimum thickness of 0.7 mm from a view point of industrial die-casting conditions. The present embodiment materializes a structure which is thinner by at least 0.45 mm than the conventional flat panel display device.

The thickness of the resin frame 2 becomes thin as described above but the strength thereof becomes possibly weak. It is, however, reinforced with the metal sheet 1 so that the resultant strength of the resin frame 2 and the metal sheet 1 is equal to or stronger than that of a sufficiently thick conventional resin frame. The U-shaped engagement portions 11 along the surrounding of the metal sheet 1 prevents each girder of the resin frame 2 (corresponding to the longitudinal side or the shorter side of the rectangle) from a bent deformation. The triangle flat surface of the resin frame 2 also avoids angular changes between the girders or twist deformations thereof. Namely, the metal sheet 1 functions as a brace and an angle reinforcing plate.

It is evident from the structure shown in FIG. 1 that electromagnetic wave noises generated from the driver circuit board 4 are securely shielded by the metal sheet 1.

Figure 3:
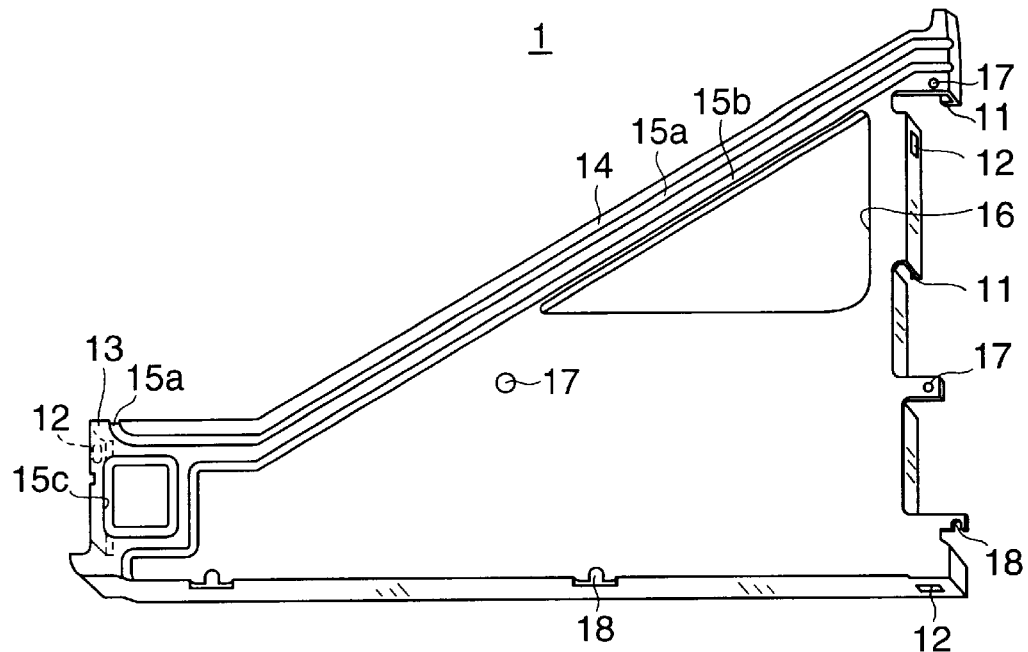
FIG. 3 is a perspective view of the metal sheet of the flat panel display device taken from a back surface thereof.

FIG. 3 shows a perspective view of the metal sheet 1 from its back surface side.

The metal sheet 1 is provided with an extended edge portion 13 in which an edge portion crossed by the longer side of the triangle and the hypotenuse side thereof (the left lower corner portion in FIG. 3) is extended along the corner portion (the left side in FIG. 3) to be provided in the vicinity of the rectangular resin frame 2. The U-shaped engagement portions 11 are provided along the frame from the extended edge portion 13. Slots 12 are defined in the vicinities of the edge portion 13 and two corners of the approximate triangle to engage with protrusions of the resin frame 2.

A bracing portion 14 corresponding to the diagonal side of the resin frame 2 is provided with two substantially parallel grooves 15a and 15b for reinforcement. The grooves 15a and 15b branch off at the extended portion 13 and reach the longer and shorter sides of the resin frame 2, respectively. Another reinforcement groove 15c is provided between the branching grooves 15a and 15b for reinforcement. The groove 15c is approximately square shaped in a plan view as shown in FIG. 3.

In order to make the metal sheet 1 light in weight, a cut-out portion 16 is defined at the corner of the shorter side of the metal sheet 1 and is approximately similar in figure to the metal sheet 1. Further, the metal sheet 1 is provided with a plurality of holes 17 and cut-out stoppers 18 for engagement with screws.

Figure 4:
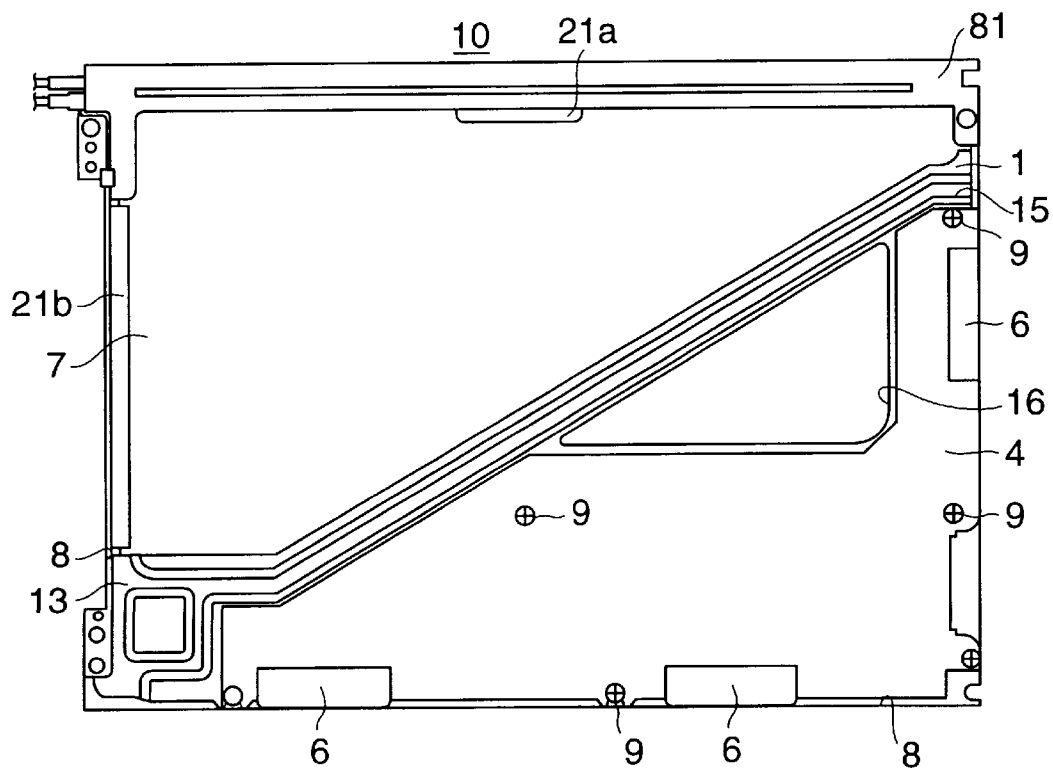
FIG. 4 is a bottom view of the flat panel display device.

FIG. 4 shows a plan view of the bottom of the assembled flat panel display.

The driver circuit board 4 together with the isolation sheet 3 is assembled with the metal sheet 1 and the resin frame 2 and is fixed by screws 9 at places where the grooves 15a, 15b and 15c and the cut-out portion 16 are not provided.

The resin frame 2 is provided with shelf-like extended portions 21a and 21b to support the light guiding plate 9 at places where the metal sheet 1 is not engaged. As shown, the extended portion 21a is disposed at the central place where the lamp cover 81 is attached while the extended portion 21b is disposed at the shorter side edge between the corner portion 13 of the metal sheet 1 and the lamp cover 81. A slight gap is defined between the resin frame 2 and the metal bezel 8.

The present embodiment provides a small size and thin thickness flat panel display in which, at the same time, the strength and reliability of its frame structure are maintained or improved to protect its display panel.

Further, since the surface of the driver circuit board 4 on the display panel side is covered with the metal sheet 1, electromagnetic wave noises are effectively prevented from leaking out to the display panel side.

Further more, the metal sheet 1 is limited to a minimum requisite area and the reinforcement structure with the U-shaped engagement portion 11 and the reinforcement grooves 15a, 15b and 15c makes the metal sheet 1 a minimum requisite thickness. Thus, a flat panel display is made light in weight while maintaining sufficient strength and high reliability of its frame structure.

In the case that only the strength of a frame structure is improved, modification of the embodiment may be limited to provision of angle reinforcement plate portions corresponding to corners of the frame structure and the bracing portion corresponding to the diagonal.

Other embodiments of the present invention will be hereinafter explained with reference to FIGS. 5 through FIG. 7.

Figure 5:
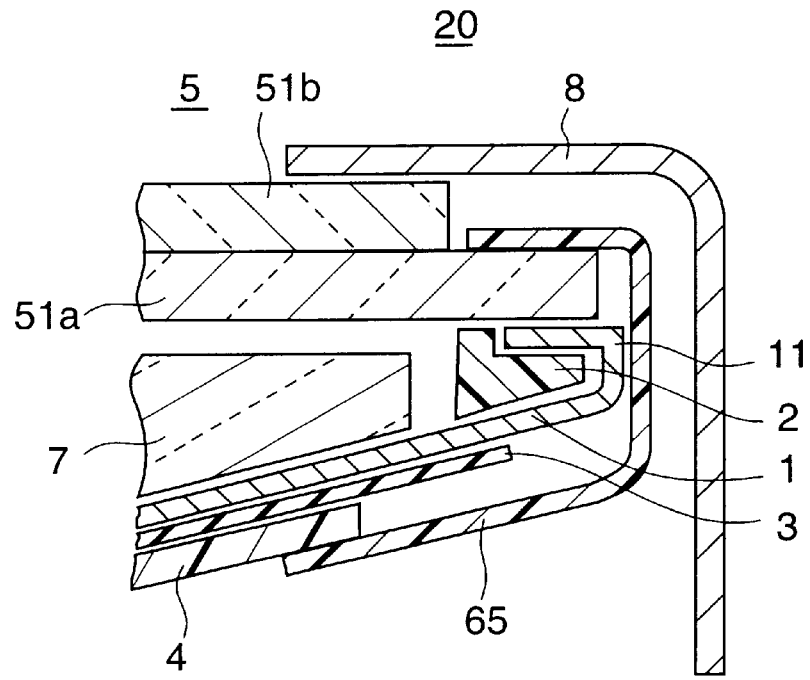
FIG. 5 is a longitudinal cross section of a surrounding portion of a second embodiment in accordance with the invention.

FIG. 5, which is similar to FIG. 1, shows a longitudinally sectional view of an edge portion structure of a flat panel display device 20.

The flat panel display device 20 is provided with a driver circuit integrated type display panel 5 made of a polycrystalline silicon liquid crystal device. The flat panel display device 20 is substantially the same in structure as the first embodiment except for the display panel 5 and a flexible printed circuit board 65 on which tape carrier packages are not disposed.

The liquid crystal display panel 5 includes two transparent isolation substrates, i.e., a circuit array substrate 51a and a counter substrate 51b. A driver circuit is provided in peripheral edges of the circuit array substrate 51a.

Figure 6:
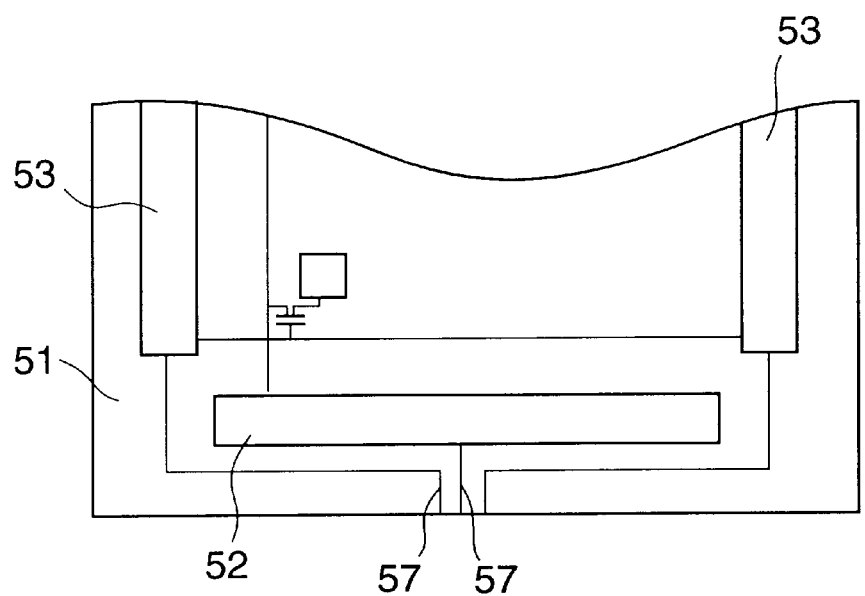
FIG. 6 is a schematic diagram of the driver circuit arrangement disposed on the circuit array substrate of the second embodiment.
Figure 7:
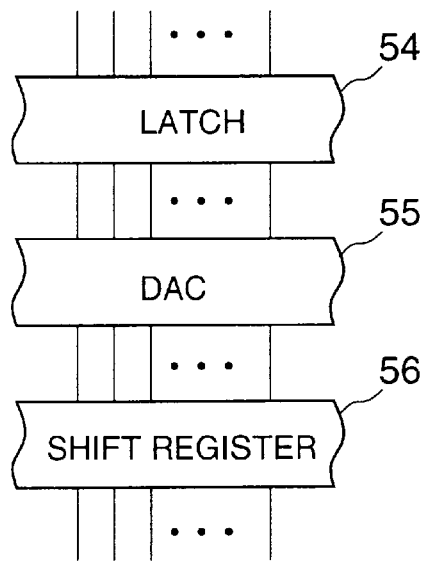
FIG. 7 is a circuit block diagram of an X-driver in the circuit array substrate shown in FIG. 6.
Figure 9:
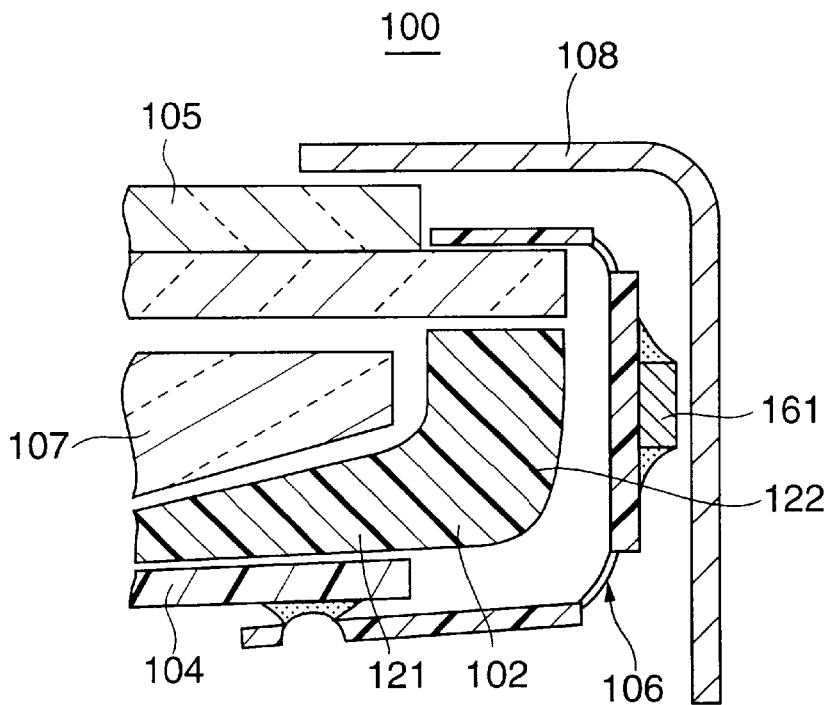
FIG. 9 is a longitudinal cross section of a surrounding portion of a conventional flat panel display device.

FIGS. 6 and 7 are a schematic circuit arrangement diagram of the array substrate 51a and a block diagram of circuits therein, respectively.

The circuit array substrate 51a is substantially rectangular in shape. X- and Y-driver circuits 52 and 53 are disposed on shorter and longer sides of the rectangular circuit array substrate 51a, respectively. Input terminals 57 of the display panel 5 are provided at shorter side where the X-driver circuit is disposed. The input terminals 57 are connected to the X- and Y-driver circuits 52 and 53 which include a latch circuit 54, a digitai-to-analogue converter circuit 55 and a shift register 56.

Figure 8:
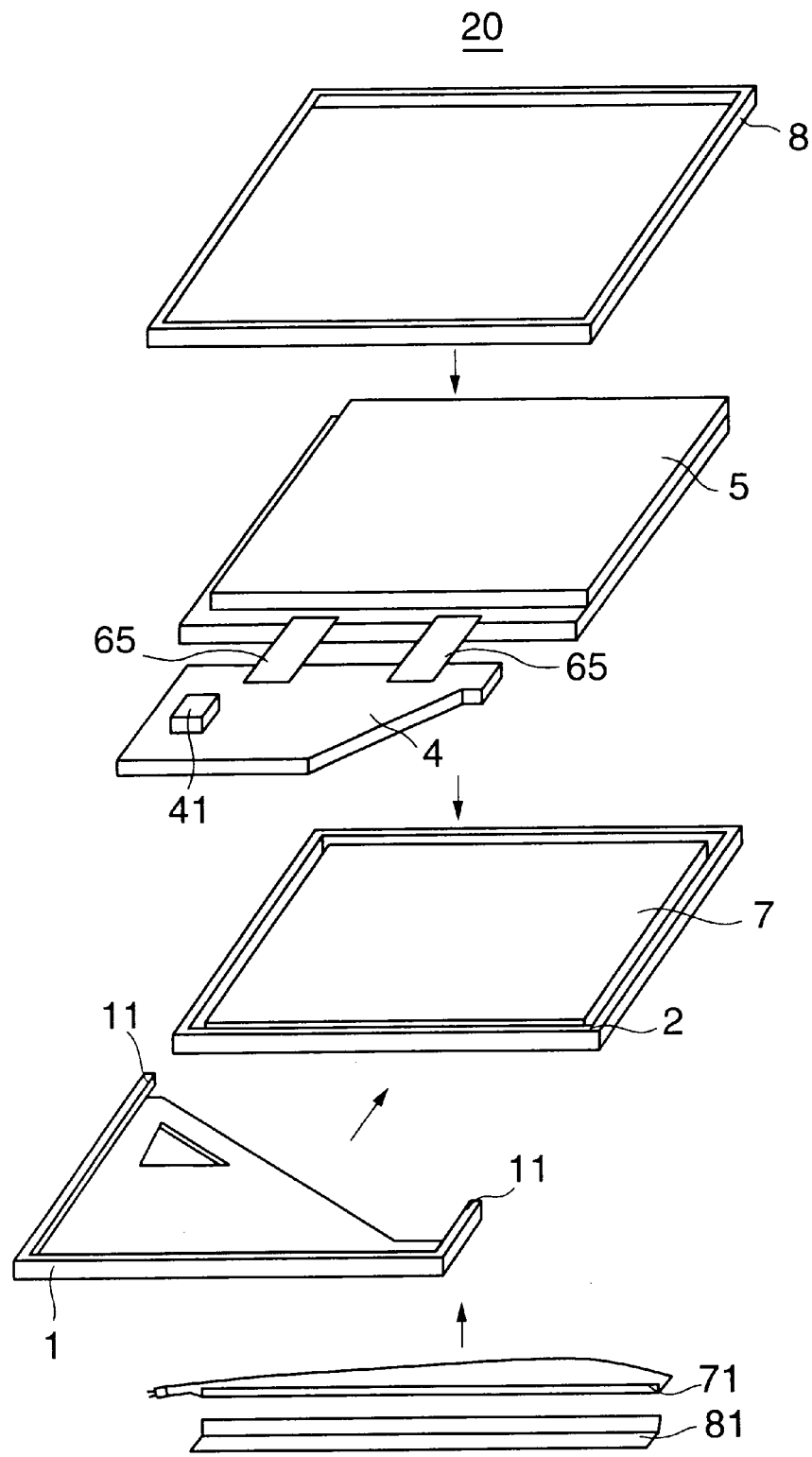
FIG. 8 is a perspective view of components to be assembled into the second embodiment.

FIG. 8, which is similar to FIG. 2, is a perspective view of components to be assembled into the flat panel display device 20 shown in FIG. 5.

As shown in FIG. 8, the driver circuit board 4 is connected to the display panel 5 through two sheets of the flexible printed circuit board 65. Control ICs 41 and the like are disposed on the driver circuit board 4.

In the present embodiment, the terminals connecting the driver circuit board 4 and the display panel 5 are more simplified and the number thereof is also reduced because driver circuits are integrated in the display panel 5.

Thus, the terminal connecting strength is increased so that applied vibrations and external force can be effectively avoided or eased and so that the terminal connecting reliability is remarkably improved. The terminal connecting work load is also significantly eased.

Where the driver circuit integrated display panel is used for the flat panel display device, the strength of the frame structure in accordance with the invention is much enhanced.

This invention provides a flat panel display device which is small in size, thin in thickness and light in weight. The present invention also provides a flat panel display device with sufficiently strong and highly reliable frame structure to protect a display panel. The invention further provides a flat panel display device with effective avoidance of electromagnetic wave noises from a driver circuit board to a display panel.

What I claim is:

1. A flat panel display device, comprising:

a display panel;

a first frame disposed on a main surface side of said display panel, said first frame having an opening corresponding to said display panel;

a second frame disposed on another surface side of said display panel, said second frame being engaged with said first frame to support said display panel; and a circuit board provided opposite said display panel on the side of said second frame, said circuit board being electrically connected to said display panel;

said second frame including a resin frame and a metal sheet engaged with or put together with said resin frame, said metal sheet being provided to extend between said display panel and said circuit board.

2. The flat panel display device according to claim 1, wherein said metal sheet substantially covers said circuit board to electromagnetically shield the same.

3. The flat panel display device according to claim 1, wherein said second frame further includes a light source.

4. The flat panel display device according to claim 1, wherein an isolation sheet is further provided between said metal sheet and said circuit board.

5. The flat panel display device according to claim 1, wherein a flexible printed circuit board is further provided to electrically connect between said display panel and said circuit board.

6. The flat panel display device according to claim 5, wherein said display panel is a liquid crystal display panel.

7. The flat panel display device according to claim 6, wherein said display panel include a driver circuit.

8. The flat panel display device according to claim 7, wherein said display panel includes a circuit array substrate and a counter substrate provided opposite to said array substrate and said driver circuit is integrated in said array substrate.

9. The flat panel display device according to claim 1, further comprising a light guide plate.

* * * * *